Jan. 21, 1936.  C. H. PHELPS  2,028,622
APPARATUS FOR CALCULATING THE ANGULARITY OF STEERING WHEELS
Filed Jan. 6, 1933  3 Sheets-Sheet 1
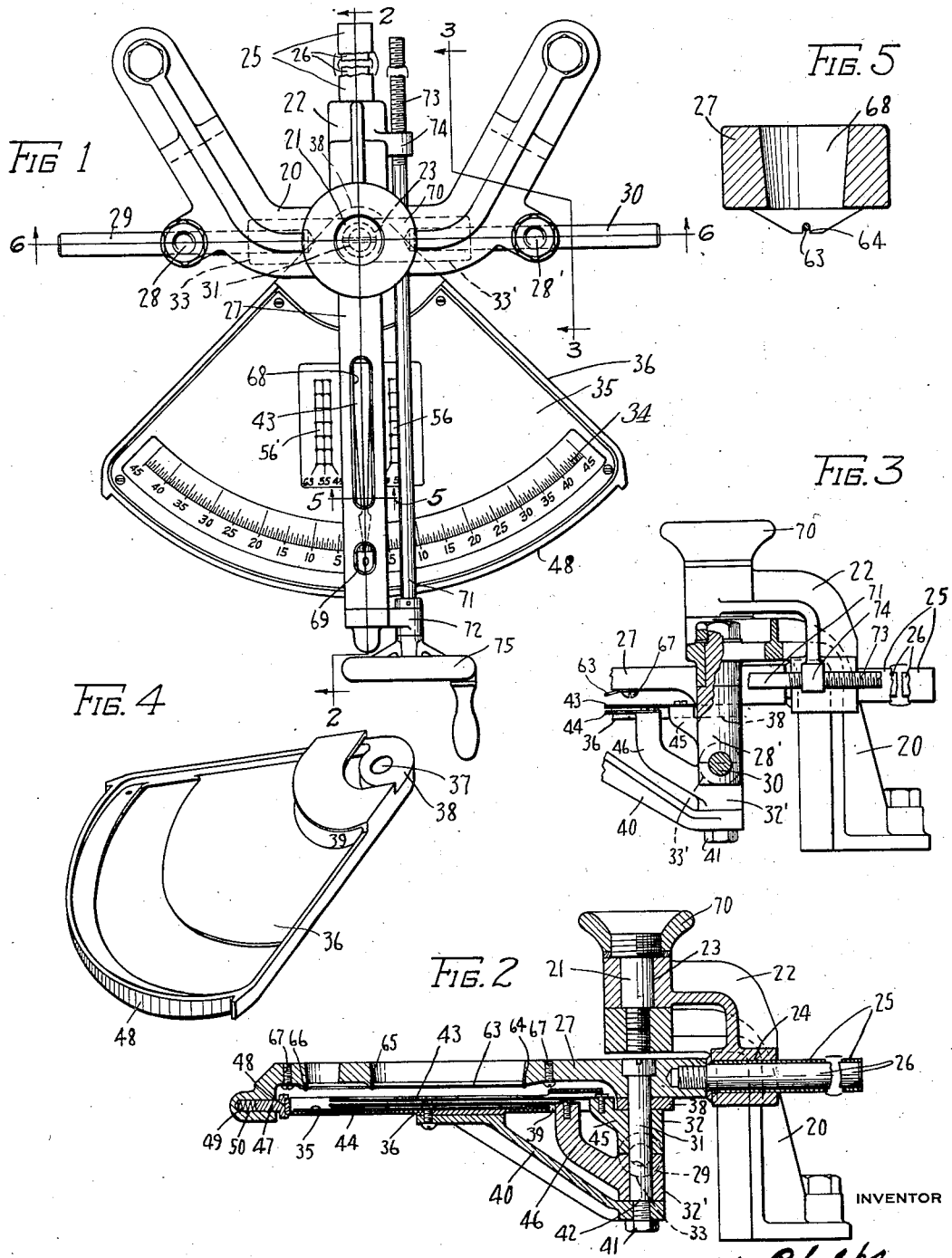

Jan. 21, 1936.  C. H. PHELPS  2,028,622
APPARATUS FOR CALCULATING THE ANGULARITY OF STEERING WHEELS
Filed Jan. 6, 1933   3 Sheets-Sheet 2
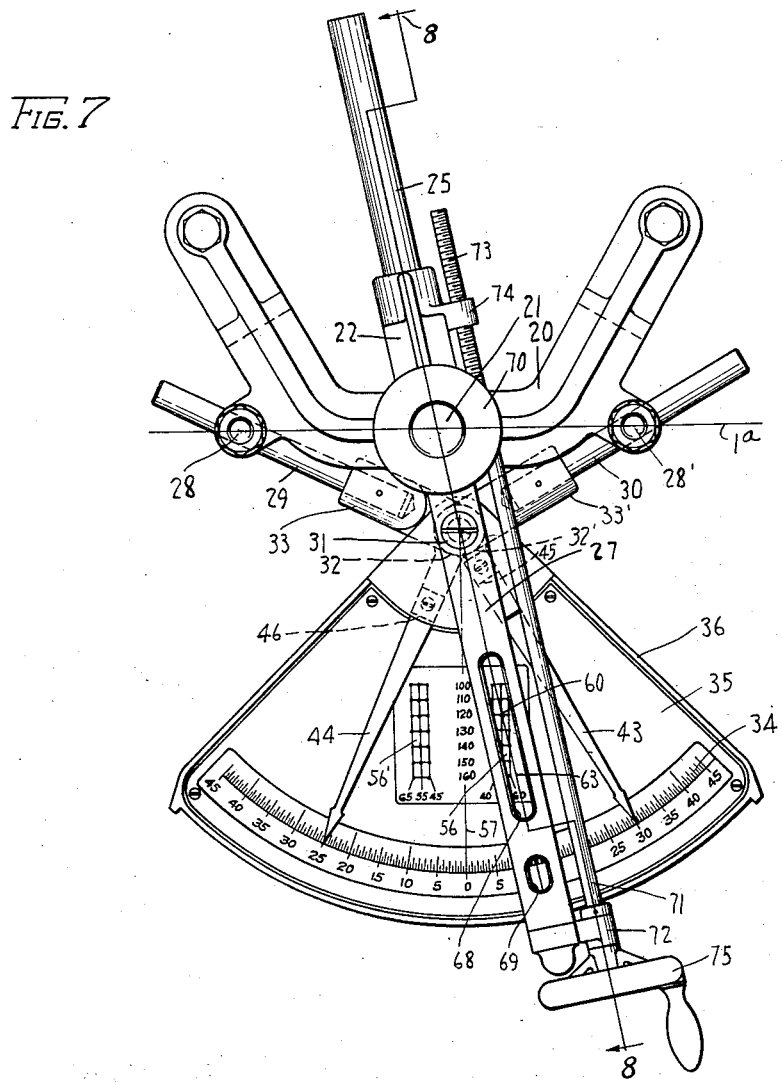
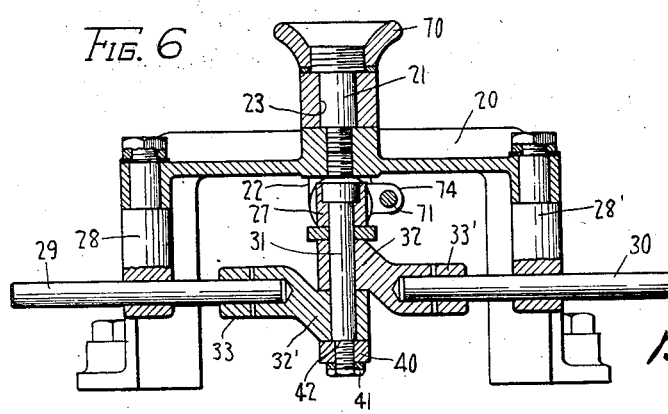

Jan. 21, 1936.  C. H. PHELPS  2,028,622
APPARATUS FOR CALCULATING THE ANGULARITY OF STEERING WHEELS
Filed Jan. 6, 1933  3 Sheets-Sheet 3
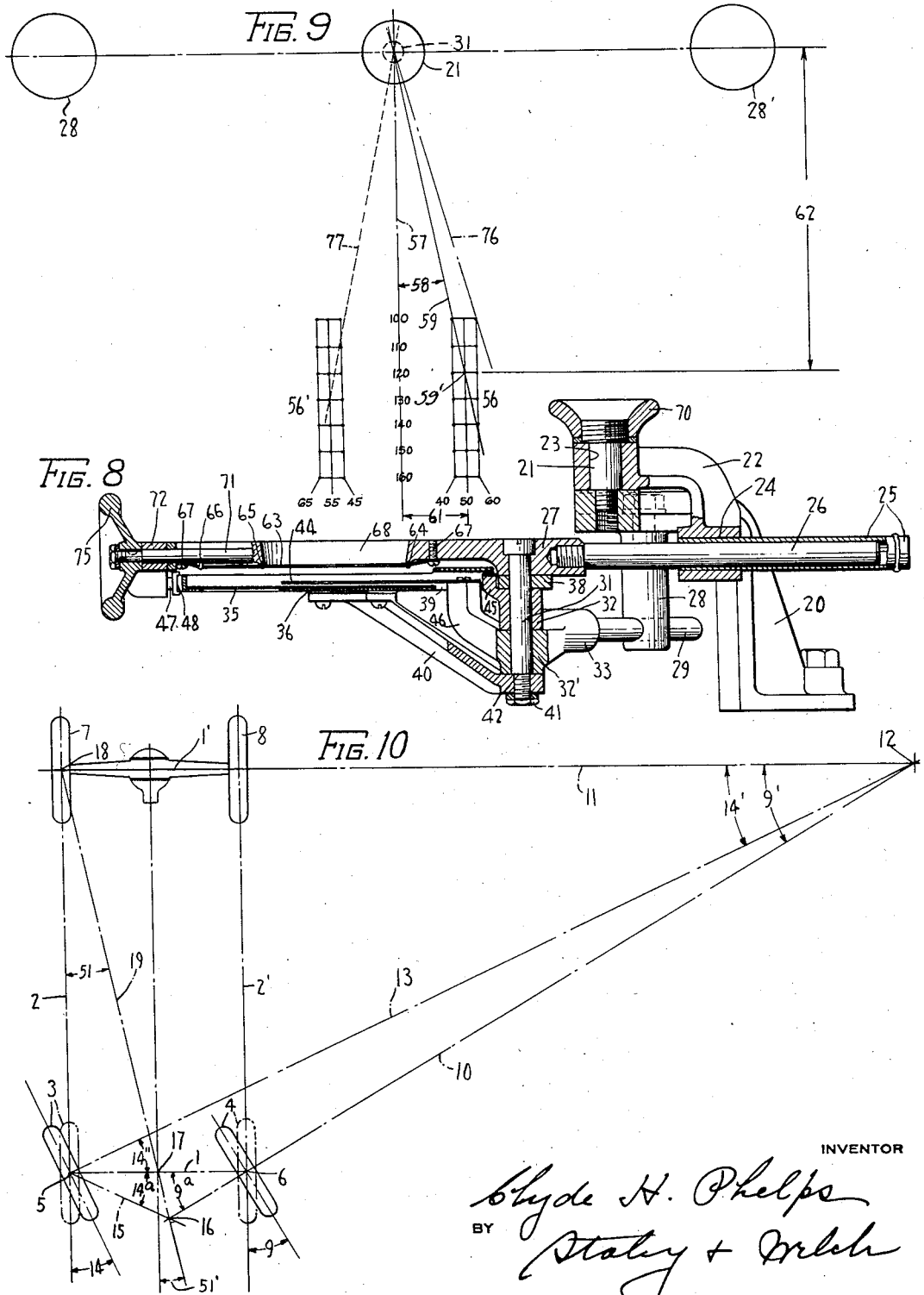
INVENTOR
Clyde H. Phelps
BY Staley + Welch
ATTORNEY Patented Jan. 21, 1936

2,028,622

UNITED STATES PATENT OFFICE 2,028,622

APPARATUS FOR CALCULATING THE ANGULARITY OF STEERING WHEELS

Clyde H. Phelps, Mount Vernon, N. Y., assignor, by mesne assignments, to The Master Electric Company, Dayton, Ohio, a corporation of Ohio Application January 6, 1933, Serial No. 650,437

23 Claims. (Cl. 33—1)

This invention relates to a calculating device by which may be readily determined the correct angle of deviation from the straight driving alignment of one steering wheel of a motor vehicle when the angle of deviation of the other wheel is known or given.

One of the objects of the invention is to provide a device, the operation of which is readily understood by the average mechanic, whereby the desired angle of a steering wheel may be read in degrees and fractions thereof, thereby eliminating the necessity of employing a series of mathematical computations which would otherwise be necessary.

In the acompanying drawings:

Fig. 1 is a top plan view of the device constructed according to the principles of the invention.

Fig. 2 is a longitudinal sectional view, with portions of some of the details in side elevation, the section being taken on the line 2—2 of Fig. 1.

Fig. 3 is a fragmentary longitudinal section on the line 3—3 of Fig. 1 with parts broken away at another point to show the construction of the device.

Fig. 4 is a perspective view of a detail.

Fig. 5 is an enlarged transverse section of a detail, the section being taken on the line 5—5 of Fig. 1.

Fig. 6 is a transverse section on the line 6—6 of Fig. 1.

Fig. 7 is a top plan view of the device with the parts in a different operating position.

Fig. 8 is a longitudinal section on the line 8—8 of Fig. 7.

Fig. 9 is a diagram showing the principle on which is based a part of the operating method.

Fig. 10 is a diagram employed to show the principle on which the construction of the device is based.

In order to arrive at a better understanding of the calculating devices of this invention, the method of arriving at the proper angles of the driving wheels in turning by mathematical calculation will first be explained. These calculations are made by taking into consideration the tread and wheel-base of any given machine and a predetermined angle of deviation of one steering wheel of the vehicle.

Referring to the drawings, Fig. 10 shows a diagrammatic plan view of a motor vehicle whose steering wheels are pivotally connected to an axle in the customary manner, and illustrates the relation of the steering wheels when making a turn, in the present case a turn to the left.

The diagram consists of a rectangle having short sides 1 and 1', and long sides 2 and 2', wherein the short sides represent the tread dimension and the long sides, the wheel-base dimension of a motor vehicle. The right and left steering wheels are indicated at 3 and 4, respectively. These wheels are assumed to be pivotally connected at the corners 5 and 6 of the rectangle. The rear wheels are represented at 7 and 8, and each corner of the rectangle represents the points of contact of each wheel with the ground.

In making a turn, for instance to the left, the left steering wheel 4 is turned to a certain angle of deviation 9 from the straight driving alignment shown in broken lines. On producing the axis of this wheel 4 in each direction from the wheel as by the line 10, the line 10 will cross the line 11 which is the side 1' of the rectangle produced to the left, or in other words, the axis of the rear axle produced in that direction. The intersection of the line 10 with the base line 11 is at the point 12, which is the turning point about which the car turns, forms an angle 9' which by axiom is equal to the angle 9 previously referred to.

Theoretically, the axis of the right steering wheel 3 produced as by the line 13 also passes through the turning point 12 forming an angle 14' with the base line 11, which is less than the angle 9'. The angle 14' is equal to the angle 14 which is the correct angle to which the right wheel 3 should turn when a turn of the left wheel 4 to the angle 9 is made.

In practice, due to accident or poor design, it is often found that the steering wheels are not properly aligned either for straight driving or turning. The devices in my co-pending application Serial No. 650,435, filed January 6th, 1933, show accurately the conditions of the steering apparatus, more especially referring to the turning alignment, while the device embodied in the present invention may be readily operated to show the correct angles the wheels should assume. The correct angles may be determined in other ways, as by plotting or by mathematics. In plotting, a diagram similar to the portion already described in reference to Fig. 10 may be used, with due consideration being given toward drawing the diagram suitably to scale so that the length of the long and short sides is proportionately equivalent to the wheel-base and tread dimensions of the car being tested, and the angle 14 is measured by means of a protractor. The angle 14 may also be determind by trigonometry, employing the above-given factors: wheel-base and tread dimensions, and in addition, the given angle 9.

The construction of my calculating device is based on the principle that the angle 14ª is equal to the angles 14, 14' and 14" and that the side 15 of the angle 14ª in being extended from the corner 5 of the rectangle will cross the produced line 10 at the point 16, and further that, in a given rectangle and produced base line regardless of the size of the angle 9' formed by the lines 10 and the base line 11 at the turning point 12, the line 15 will intersect the produced line 10 at points such as 16 which are in exact alignment with the point 17 at the center of the side 1 and the point 18 at the upper corner of the rectangle, as shown by the line 19.

It should also be seen that the angle 9ª is equal to the angle 9 and that on any positioning of the wheel 4, the produced axis 10 fixes the point 16 in the line 19 from which point the line 15 in extending to the corner 5 will always form an angle 14ª with the line 1 equal to the angle 14". Therefore, with the angle 9ª known and measured on an imaginary protractor scale whose center is at the corner 6 it should be clear that the correct angle 14ª may be read from a second imaginary protractor scale having its center at the corner 5.

The calculating device is a small, portable mechanism having pivotally connected rods to represent the lines 15 and 10 of the diagram. These rods are further pivotally connected to a slidable arm by a center bolt representing the point 16 whereby on bringing a pointer attached to one of the rods to a desired angle reading by moving outwardly or inwardly, the point 16 along the line 19, the correct angle is read from a suitably positioned pointer attached to the other rod.

A U-shaped support 20 is provided for the device and is adaptable to being mounted on a bench or other form of support. Into the center of the bracket a vertically disposed stud 21 is threaded, projecting upwardly from the bracket. Resting on the upper central surface of the support 20 and having a rotatable bearing on the stud 21 is a bent bracket 22. The bent bracket 22 is provided with bores 23 and 24, the axes of which are at right angles to one another and are in the same vertical plane. The bent bracket hangs downwardly from the stud 21, the stud fitting in the bore 23, while in the horizontally disposed bore 24 a rearwardly extending tube 25 is fixed. In this tube 25 is slidably supported a rod 26, whose forward end is threaded into the end of a forwardly extending horizontally disposed arm 27.

The point 17 in the diagram in Fig. 10 is represented by the stud 21, and as this point is in alignment with the pivotal connections of the wheels with the axle represented by the points 5 and 6, so also in the support 20 are these three equidistant and aligned points represented at equidistant and aligned points on either side thereof by rotatably mounted downwardly extending studs 28 and 28'. Each of these studs partly supports a rod, one being indicated at 29 and the other at 30, the rods being slidably mounted in the studs. These rods 29 and 30 represent, respectively, the produced correct axes of the steering wheels 3 and 4, or in other terms, the line 10 and the line 15, which latter line represents a side of a transferred angle 14ª equal to the angle 14". The rods 29 and 30 are pivotally connected together and to the arm 27 by a vertically disposed center-bolt 31, (the axis of which represents the point 16 of the diagram), through the medium of rod ends 32 and 32' each of which has an offset hub 33 and 33', to allow the axes of the rods 29 and 30 to be in the same horizontal plane and, at the initial working position of the device to provide that the rods are also in axial alignment with one another as seen in Figs. 1 and 2.

It has been previously stated that in checking the steering alignment, the wheels are turned to either a right or left turn, the inner wheel in either case being turned to some given angle, say 30°. To simulate a turn of this degree with the device, the rod 30 is caused to assume an angle of 30° with a line 1ª (Fig. 7) which line corresponds to the line 1 of the diagram. A convenient means for determining when this rod 30 is at a given angle and also to ascertain the angle made by the rod 29 with the line 1ª, is afforded by the use of a protractor scale 34, over which sweep pointers attached to the rods, whereby the principal object and advantage of the invention is accomplished.

The protractor scale 34, (Figs. 1 and 7) is graduated in degrees in an ascending order on either side of a zero point and preferably is extended to measure a possible angle of 45°. The scale is imprinted on any suitable surface, in the present instance on a thin metallic scale plate 35 secured to a fan-shaped supporting member 36, a detailed illustration of which is given in Fig. 4. It is necessary to mount the scale supporting member 36 so that the scale 34 is concentrically arranged with reference to the pivotal connection of the rods 29 and 30, and to this end the scale support member 36 is rotatably mounted on the bolt 31, there being an opening 37 in the hub 38 of the member 36 through which the bolt 31 is passed. The scale support 36 is provided with an opening 39 in the bottom adjacent the hub 38 through which project bosses to which pointers are attached as will be described later.

The scale support 36 is further stiffened by the use of a brace member 40 (Figs. 2, 6), the upper end thereof being secured to the support 36 by screws, while into the lower end thereof the end of the center bolt 31 is threaded and locked by a lock nut 41. The center bolt is provided with a shoulder 42 in order that free movement of the members through which the bolt passes may be permitted.

The pointers with which the rods 29 and 30 are provided and by which the readings on the scale 34 are made, are indicated at 43 and 44. The pointer 43 is attached to the upper end of a forwardly and upwardly projecting boss 45 integrally attached to the rod end 32 (Figs. 2, 3) so as to extend forwardly from the center of the bolt 31 and at right angles to the axis of the rod 29. The pointer 44 is similarly mounted at the upper end of a corresponding boss 46 integrally attached to the forward side of the rod end 32', with the exception that the boss 46 is slightly less in height than the boss 45, and projects further forwardly whereby when the device in the initial working position, as shown in Figs. 1 and 2, the pointer 43 is superimposed over the pointer 44. In this position the tip of each pointer registers with a common graduation mark on the scale 34.

Undesired movement of the scale supporting member 36 is prevented by a frictional contact with the arm 27, through the arrangement shown in section in Fig. 2. A plunger 47 is pressed against the outer peripheral surface of the edge 48 of the scale holder 36 by means of a spring 49 inserted in a pocket 50 at the forward end of the arm 27.

The purpose of the arm 27 is to represent exactly the slope of a line such as the line 19 (Fig. 10). It will be remembered that the line 19 in the diagram contains the points 16, 17 and 18 in exact alignment. A convenient arrangement is provided in the device by the employment of the arm 27, in that the rods 29 and 30 representing the axes of the steering wheels 3 and 4 are brought forwardly to a common pivotal connection, as at 16 in the diagram, or at the bolt 31 in the device itself. The slope of the line 19 will vary according to the wheel-base and tread standards of different vehicles, although the same slope will be found in cars in which these factors are proportionately equal; that is, in a car of thirty inch tread and sixty inch wheel-base, the slope is the same as in a car of forty-eight inch tread and ninety-six inch wheel-base.

Referring to Fig. 2, it will be seen that the arm 27 is revolubly mounted for partial rotation in a horizontal plane on the main support 20 about the vertical axes of the stud 21 and also the centerbolt 31, therefore the slope of any line 19 may be reproduced readily by swinging the arm 27 to a similar angle.

The angle through which the arm is to be moved is dependent on the tread and wheel-base quantities, and to determine by mathematics the angle represented by the character 51 (Fig. 10) the equation is solved: tan=side opposite divided by the side adjacent, where one-half the tread is the side opposite and the wheel-base is the side adjacent. The quotient is the tangent of the angle 51 and the angle is found in a table of tangents. In regard to taking as the side opposite, one-half the tread, it should be remembered that the produced axis of the left wheel 4 (Fig. 10) intersects the side 15 of the transferred angle 14ª at the point 16, which point is in perfect alignment with the points 17 and 18, and that the point 17 bisects the line 1 representing the tread. It is also evident that the angle 51' equals the angle 51, therefore the arm is pivoted midway between the swivel studs 28 and 28' and is swung sideways to the angle 51 desired.

In the present invention, however, the necessity for calculations as given above or any other form is eliminated. This is accomplished by providing in the present case, a plurality of graphs consisting of co-ordinating lines, the ordinates or vertical lines being denominated by numerals representing various tread dimensions and the abscissæ or horizontal lines in a similar way, denoting wheel-base dimensions. The graphs (Figs. 1, 7, 9) are accurately imprinted or etched on the upper surface of the plate 35 which carries the protractor scale 34, and are so positioned that the intersections of the ordinates and abscissæ stand in a definite, angular relationship with the center of rotation of the arm 27.

Referring especially to Fig. 9, the graph indicated in general at 56 is composed of abscissæ or vertical lines enumerated 40, 50 and 60, increasing to the right, while the ordinates or horizontal lines are enumerated 100, 110, etc., increasing downwardly. The graph 56 is located at the side of the center of the scale plate, the center being indicated by the line 57 (Figs. 7, 9) extending through the zero point of the protractor scale 34 and the pivotal center of the rods and arm, represented as the center of the bolt 31. The distance of the graph from the center line 57 measured in a direction toward the abscissæ bears a definite relation to the distance of the graph measured in a direction toward the ordinates downwardly from the center of the bolt 21, whereby an angle such as 58 formed by a line 59 passing through an intersection point 59' and through the center of the bolts 21 and 31 (Fig. 9) is the same angle as would be determined by the calculation to find the tangent of the angle wherein half of fifty is the side opposite and one hundred and twenty is the side adjacent, and finding the angle from the table of tangents. The distance of this intersection 59' from the line 57 is indicated by the dimension 61, while the dimension 62 represents the distance of the point 59' from the center of rotation 21 in the direction of the ordinates, therefore, the dimension 61 becomes a side opposite and 62 the side adjacent, whereby the location of the point 59' may be accurately fixed.

Various settings of the arm 27 are diagrammatically shown in Fig. 9. The full line 59 represents the angular position of the arm 27 when testing a car of fifty inch tread and one hundred and twenty inch wheel-base. By a dot-dash line 76, the arm position is shown for a car of sixty inch tread and one hundred inch wheel-base, while the position of the arm for a car having a fifty-five inch tread and one hundred and thirty inch wheel-base is shown by the broken line 77.

The abscissæ are spaced from one another in accordance with a definite scale, whereby for example an intersection representing a tread dimension of sixty inches and a wheel base of one hundred and twenty inches is located further from the center line than the intersection point 59' just mentioned. In the same manner the abscissa denoting a forty inch tread is located nearer the line 57, this abscissa being equally distant from the abscissa denoted fifty as the abcissa for the sixty inch tread. Since the increases in the wheel-base denominations are of equal value, it is obvious that the spacing of the ordinates is equidistant. It will be noticed, however, that the distance between any two abscissæ is one-half the distance between any two ordinates; the purpose of which is to provide by means of the graph, that the tread denomination in relation to the wheel-base denomination is halved according to the terms of the equation given above.

The graph indicated at 56' is similar to the graph 56 just described except that in the present case, tread dimensions of forty-five, fifty-five and sixty-five are denoted. Since the abscissa nearest the center line 57 is denoted forty-five or an increase of five inches over the abscissa denoted forty in the graph 56, the graph 56' is placed a further distance from the center amounting to one-half the space between abscissæ.

A single graph containing the dimensions shown may be employed as the device will show the desired angle for either wheel with an arm setting on one side only, but in the single graph the abscissæ would be so closely spaced that difficulty in finding a sufficiently accurate setting would result. Consequently, the graphs are separated.

In operation the device is placed in the initial working position as shown in Figs. 1 and 2, wherein the axes of the bolts 21 and 31 are in exact vertical alignment, the rods 29 and 30 are in longitudinal alignment and the zero point on the protractor scale 34 is directly under the tips of the superimposed pointers 43 and 44. The arm 27 is then swung to a position over the graph 56 or 56', depending on which graph contains the tread dimensions in mind in which the center of the arm is directly over a desired intersection point, care being taken to prevent any movement of the scale plate supporting member 36. Means are provided for accurately noting the position of the arm over or near an intersection by the use of a taut wire 63 (Figs. 2, 5, 7) laid in centrally located grooves 64, 65 and 66 and secured by screws 67 in the arm 27. The positioning is observed through an elongated opening 68 vertically disposed in the arm 27, the operator being enabled to sight through the opening 68. A similar shorter opening 69 is provided to observe the tips of the pointers 43 and 44 and also to note the position of the zero point below the pointers when the device is placed in the initial working position. After the arm 27 has been placed in the desired angular position, it may be retained in this angular position by locking with the hand-wheel 70, which operation binds the angle bracket 22 tightly to the main bracket 20.

The arm 27 is then drawn outwardly (toward the operator), this movement being possible by reason of the slidable mounting of the arm 27 in the bracket 22, by means of the mounting described in connection with the explanation of the rod 26 and tube 25. The outward movement of the arm 27 causes a forward movement of the pivotal connection of the rods 29 and 30, since these rods are pivotally connected with the arm 27 and reproduces a movement of the point 16 outwardly along the line 19 in the diagram Fig. 10.

This movement is conveniently accomplished in the present invention by providing a hand-wheel and screw mechanism. A rod 71 (Fig. 7) is supported rotatably at its forward end in a boss 72 integrally attached to one side of the arm 27 near the forward end of the arm, while the inner end of the rod 71 is screw-threaded as shown at 73, and threaded in a boss 74 integrally attached to the corresponding side of the bracket 22 in axial alignment with the above-mentioned boss 72. A hand-wheel 75 is secured to the forward end of the rod 71. Rotation of the rod 71 in either direction causes the arm 27 to move outwardly or inwardly as the case may be, the rod 26 sliding in the supporting tube 25.

The outward movement of the arm 27 along the line of the angular setting obviously causes the pointers 43 and 44 to leave the zero point and move in opposite directions along the protractor scale 34, and this movement is continued until the pointer on the side to which the arm is swung comes to rest at a given angular setting of the inner steering wheel, as for example a 30° setting at which the inner wheel 4 in the diagram Fig. 10 is assumed to be set.

The lower pointer 44 connected with the rod 29 representing the axis of the right wheel 3 (Fig. 10) will come to rest on or near a degree graduation representing the angle of deviation to which the right wheel should properly turn when the inner or left wheel 4 is turned to the stated angle of thirty degrees. A sufficiently accurate reading for the purpose is made when degrees and the nearest quarter thereof are noted, a quarter degree being easily observed on the scale. In Fig. 7 the result of the operation shows the correct angle to be approximately twenty-five degrees. As a check, a mathematical calculation shows the correct angle for the right or outer wheel to be 24° and 55'. As this latter angle lacks but five minutes of being twenty-five degrees, this angle is taken as the proper angle at which to set the outer wheel.

It was stated that a pair of graphs is positioned on the scale plate 35, one graph on either side of the center of the plate in order to provide an easily read spacing between the abscissæ.

This is the sole reason for employing the separated graphs, as the determination of any angle desired may be found by setting the arm 27 on the same side in all tests, regardless of which wheel is being checked.

The following rule governs the use of the device: The given angle of the inner steering-wheel is indicated by the pointer sweeping over the portion of the protractor scale over which the arm is positioned, and the desired angle of the outer wheel is read from the opposite pointer.

While I have referred in the foregoing to a calculation based upon the wheel base and tread of the vehicle, it is to be understood that such calculation may be based upon the wheel base length and the distance between the intersections of the longitudinal axes prolonged of the king pins of the steering wheel and the ground line. In other words, the calculation may be any well known calculation made to determine the correct angle of one steering wheel when the other steering wheel is at a known or predetermined angle.

Having thus described my invention, I claim:

1. In a calculating apparatus of the character described, a pair of pivotally connected members each mounted for swinging and sliding movement about and through a fixed point, said members when axially aligned representing a line extending through the axes of the steering wheels of a vehicle placed in a straightaway position, means for moving and guiding said members to bring the pivotal point of connection thereof at a point representing a known calculation made to determine the correct angle of one steering wheel when the other steering wheel is at a known angle, and means to indicate the angular positions of said members.

2. In a calculating instrument of the character described, a main support, a bracket rotatably mounted on said support, an arm slidably carried by said bracket whereby the same may have rotative and slidable movement relative to said support, two oppositely positioned rods pivotally connected with said arm, means attached to said support for swivelly and slidably supporting said rods, means to indicate a predetermined position in which said arm may be swung corresponding to a known calculation made to determine the correct angle of one steering wheel of a vehicle when the other steering wheel is at a known angle, means for indicating the position of one of said rods to correspond to the known angle of one of the steering wheels, and means for indicating the position of the other rod when the said arm and first mentioned rod have been moved to such positions.

3. In a calculating apparatus of the character described, a main support, an arm rotatably and slidably connected with said support, means for indicating angular positions of said arm with relation to said support each corresponding to a known calculation made to determine the correct angle of one steering wheel of a vehicle when the other steering wheel is at a known angle, a pair of rods pivotally and slidably connected to said support at fixed points on opposite sides of said arm, means for pivotally connecting said rods to said arm whereby sliding movement of said arm will position said rods in angular positions with relation to each other, a scale, and a pointer connected with each rod cooperating with said scale to indicate the angular positions of said rods.

4. In a testing apparatus of the character described, a main support, an arm pivotally and slidably connected with said support, means to indicate angular positions of said arm with relation to said support each corresponding to a known calculation made to determine the correct angle of one steering wheel of a vehicle when the other steering wheel is at a known angle, means to lock said arm in such angular positions, a pair of rods pivotally and slidably connected with said support at fixed points on opposite sides of the pivotal connection of said arm and said support at equal distances therefrom and in alignment therewith, means for pivotally connecting said rods with said arm so that said rods may be moved from an axially aligned position to angular positions with relation to said support after said arm has been locked in a predetermined angular position, and means for indicating the angular positions of said rods.

5. In a testing apparatus of the character described, a main support, an arm pivotally and slidably connected with said support, means to indicate angular positions of said arm with relation to said support each corresponding to a known calculation made to determine the correct angle of one steering wheel of a vehicle when the other steering wheel is at a known angle, means to lock said arm in such angular positions, a pair of rods pivotally and slidably connected with said support at fixed points on opposite sides of the pivotal connection of said arm and said support at equal distances therefrom and in alignment therewith, means for pivotally connecting said rods with said arm so that said rods may be moved from an axially aligned position to angular positions with relation to said support after said arm has been locked in a predetermined angular position, and means for indicating the angular positions of said rods, such means including a pointer connected with each rod at the pivotal point of connection thereof with said arm, and a scale pivotally connected with said arm coincident with the pivotal points of said rods therewith and having indicia cooperating with said pointers.

6. In a testing apparatus of the character described, a main support, a bracket pivotally connected with said support, an arm slidably mounted in said bracket, a rotatable rod having a threaded connection with said bracket and a rotatable connection with said arm to slide said arm with relation to said bracket, a pair of rods having their outer ends pivotally and slidably connected with said support at points on opposite sides of the pivotal connection of said bracket with said support and equidistant therefrom and in alignment therewith, means for pivotally connecting the inner ends of said rods with said arm, means for locking said arm in different angular positions with relation to said support, and means for indicating the angular positions of said rods when moved by said arm after said arm has been placed in a predetermined angular position.

7. In a calculating device of the character described, a support, an arm pivotally connected with said support so as to be placed in different angular positions with relation thereto, said arm being also slidably connected with said support, a graph having coordinating intersecting lines and over which said arm is adapted to swing, the abscissæ of which represents tread dimensions and the ordinates of which represent wheel base dimensions, an indicator on said arm to enable it to be positioned accurately with any one of the intersections of the lines of said graph, means for locking the arm to said support in said angular position but permitting sliding movement thereof with relation thereto, and a pair of members pivotally connected to said arm, and movably connected at fixed points representing the pivots of a pair of steering wheels of a vehicle so as to be moved by said arm to different positions after said arm has been locked in a predetermined anguar position and means for indicating the angular positions of said members.

8. In a device to indicate the proper angle to which a steering wheel should turn when the other steering wheel is turned to a given angle, a main support, a bracket rotatably mounted on said support, an arm slidably carried by said bracket and having thereby rotative and slidable movement relative to said support, oppositely positioned rods pivotally connected with said arm and partly supported by said arm, means attached to said support for swivelly and slidably supporting the remaining portions of said rods, an indicator attached to each rod adjacent its pivotal connection with said arm, a protractor scale with which each indicator cooperates, said arm, rods, indicators and scale constituting movable members having an initial working position wherein the rods are axially aligned and the axes of the center of rotation of the arm and pivotal connection of the rods with the arm are also axially aligned, means to indicate an angular positioning of the arm where the angle is equal in degree to the angle made by a line extending from the center of the steering axle of a motor vehicle to the center of a rear wheel with a line representing the wheel-base dimension of said vehicle, said last mentioned indicating means consisting of a graph having coordinating lines, the abscissæ of which graph represent tread dimensions and the ordinates of which graph represent wheel-base dimensions, and means for moving the movable members.

9. In a calculating apparatus of the character described, two slidably and pivotally mounted members which when aligned represent the prolonged axes of steering wheels in a straightaway position, said members having adjacent ends pivotally connected together, and means pivotally connected with the pivoted point of said members for moving and guiding the said members to a point where one represents the axis prolonged of the inner steering wheel and the other represents the axis prolonged on a transferred angle of the outer steering wheel when said wheels have been turned to a given steering position, and means for indicating the angles of said members in said last-mentioned position.

10. In a calculating machine of the character described, two pivotally connected and slidably and pivotally mounted members representing when in aligned position the axes prolonged of steering wheels in a straightaway position, and means connected with the pivotal point of said members for positioning said members at an angle to each other so that one represents the known angle of one steering wheel in a given position and the other represents the correct angle of the other steering wheel, and means for indicating said positions of said members.

11. In an apparatus for calculating the required angularity of steering wheels of a vehicle, a support, a scale, indicating means cooperating with said scale, pivotally and slidably mounted devices connected with said indicating means and movable with relation to a point on said apparatus representing a known calculation made to determine the correct angle of one steering wheel when the other steering wheel is at a known angle to cause said indicating means to indicate a predetermined angular setting of one of said steering wheels and to also cause said indicating means to indicate the required angular position of the other steering wheel to cause said pair of wheels to travel in concentric circles about a point on the axis prolonged of another pair of wheels of the vehicle.

12. In an apparatus for calculating the required angularity of steering wheels of a vehicle, a support, a scale, indicating means cooperating with said scale, a pivotally and slidably mounted device, additional indicating means cooperating with said device to enable said device to be set at a point representing a predetermined calculation, and a connection between said device and said first-mentioned indicating means to cause the indication on said scale, by an additional movement of said device, of the required angle of turn of each wheel of a pair of steering wheels of a vehicle when in position to effect the turning of the vehicle.

13. In an apparatus for determining the relative angularity of the steering wheels of a vehicle when in a position to effect the turning of the vehicle, a support, indicating means for indicating the relative angularity of said wheels, pivotally and slidably mounted devices for operating said indicating means, said devices being movable to an initial setting point therefor prior to the operation of said indicating means, and means to determine an initial setting of said devices at a point representing a predetermined calculation.

14. In a calculating apparatus of the character described, a support, two members each pivotally and slidably mounted at a fixed point representing the pivot of one of a pair of steering wheels of a vehicle, a pivotal and slidable element arranged to be positioned at a point representing a known calculation made to determine the correct angle of one steering wheel when the other steering wheel is at a known angle, means for pivotally connecting said members and element on a common axis such that when said parts are moved to a position to bring one of said members on a line representing the axis prolonged of one steering wheel when in steering position the other member will represent the correct angle of the axis prolonged of the other steering wheel, and means for indicating such positions of said members.

15. In a calculating apparatus of the character described, a support, two members each pivotally and slidably mounted at a point representing the pivot of one of a pair of steering wheels of a vehicle, a pivotal and slidable element to which said members are pivotally connected at a common point, such movable element being arranged to be positioned at a point representing a known calculation made to determine the correct angle of one steering wheel when the other steering wheel is at a known angle, said pivotal connection representing the midway point between wheel pivots when said members are aligned, means for indicating when one of said members coincides with a line representing the axis prolonged of one of said steering wheels, and means for indicating the position of the other member.

16. In a calculating apparatus of the character described, a pair of pivotally connected members each mounted for swinging and sliding movement about and through a fixed point representing the pivot of a steering wheel, said members when axially aligned representing a line extending through the axes of the steering wheels of a vehicle placed in straightaway position, means for moving and guiding said members to bring the pivotal connection thereof at a point representing a known calculation made to determine the correct angle of one steering wheel when the other steering wheel is at a known angle, and means to indicate the angular positions of said members.

17. In a calculating apparatus of the character described, a pair of pivotally connected members each mounted for swinging and sliding movement about a fixed point, said members when axially aligned representing a line extending through the axes of the steering wheels of a vehicle placed in a straightaway position with the pivotal connection of said members midway of said fixed points, an element movable to different angular positions and connected with said members so as to move the pivotal connection of said members to a point representing a known calculation made to determine the correct angle of one steering wheel when the other steering wheel is at a known angle, and means to indicate the angular positions of said members.

18. In a calculating mechanism of the character described, a support, a pivotal and slidable element, means for placing said element at a point representing a known calculation made to determine the correct angle of one steering wheel of a vehicle when the other steering wheel is at a known angle, two members representing prolonged axes of the steering wheels of the vehicle, indicating means connected with said members, means for pivotally and slidably supporting said members at fixed points representing the pivots of the steering wheels, and means also pivotally connecting said members and said element so that said members may be positioned by said element to cause said indicating means to indicate the known angle of deviation of one steering wheel and the correct angle of deviation of the other steering wheel.

19. In a calculating instrument of the character described, a support, a pivotal and slidable element movable to the desired angular position corresponding to a known calculation made to determine the correct angle of one steering wheel of a vehicle when the other steering wheel is at a known angle and also capable of an additional movement on a line corresponding to the angular position assumed thereby, and two members pivotally connected to said element on a common axis and pivotally and slidably connected at fixed points representing the pivots of the steering wheels, said members being movable by the additional movement of said element after it has been fixed in the desired angular position until one of said members coincides with the axis prolonged of the inner steering wheel turned to a given angle, thereby causing the other member to coincide with the correct transferred axis prolonged of the outer steering wheel, and means for indicating the positions of said members.

20. In a calculating instrument of the character described, a support, a pivotally and slidably mounted element on said support movable to different positions each corresponding to a known calculation made to determine the correct angle of one steering wheel of a vehicle when the other steering wheel is at a known angle, and two members pivotally and slidably mounted at spaced points on said support pivotally connected to said element at a common axis coincident with the pivotal axis thereof and movable thereby to bring the common axis at a point on a line representing the angular setting of said first member, a scale, and pointers connected with said last mentioned members cooperating with said scale.

21. In a calculating instrument of the character described, a support, a protractor scale, a graph representing mathematical calculations, pivotal means for setting the instrument to the graph to represent a predetermined basis for a calculation to be made by the instrument, two rotating hands to cooperate with the scale, slidably mounted means for moving one of said hands to a predetermined position on said scale and for automatically moving the other hand to a relative position on said scale determined by the original setting of the instrument to the graph.

22. In a calculating instrument of the character described, a support, pivotal means including a graph representing mathematical calculations for setting the instrument to represent a predetermined basis for a calculation to be made by the instrument, indicating devices to give two indications, slidably mounted means for setting one indicating device at a predetermined position and automatically setting the other indicating device to a relative position determined by the original setting of the instrument and the setting of the first indicating device.

23. In an apparatus for calculating the angularity of steering wheels of a motor vehicle, a support, a scale, a pair of indicators movable over said scale, and pivotally and slidably mounted devices movable with relation to a point on said apparatus representing a calculation made to determine the correct angle of one steering wheel when the other steering wheel is at a known angle to cause one of said indicators to indicate a predetermined angular setting of one of said steering wheels and the other indicator to indicate the required angular position of the other steering wheel when said wheels are in a position to travel in concentric circles about a point on the axis prolonged of another pair of wheels of the vehicle.

CLYDE H. PHELPS.